US012773731B2

(12) United States Patent
Kimblad et al.

(10) Patent No.: US 12,773,731 B2
(45) Date of Patent: Oct. 27, 2026

(54) POWDER APPLICATOR FOR METAL-BINDER JETTING

(71) Applicant: DIGITAL METAL AB, Höganäs (SE)

(72) Inventors: Hans Kimblad, Höganäs (SE); Niclas Malm, Höganäs (SE)

(73) Assignee: DIGITAL METAL AB, Höganäs (SE)

( * ) Notice: Subject to any disclaimer, the term of this patent is extended or adjusted under 35 U.S.C. 154(b) by 0 days.

(21) Appl. No.: 18/720,799

(22) PCT Filed: Mar. 6, 2023

(86) PCT No.: PCT/EP2023/055560
§ 371 (c)(1),
(2) Date: Jun. 17, 2024

(87) PCT Pub. No.: WO2023/169982
PCT Pub. Date: Sep. 14, 2023

(65) Prior Publication Data

US 2025/0050420 A1 Feb. 13, 2025

(30) Foreign Application Priority Data

Mar. 7, 2022 (EP) .................................... 22160631

(51) Int. Cl.
*B22F 12/57* (2021.01)
*B22F 12/67* (2021.01)
(Continued)

(52) U.S. Cl.
CPC .............. *B22F 12/57* (2021.01); *B22F 12/67* (2021.01); *B33Y 30/00* (2014.12); *B22F 10/14* (2021.01)

(58) Field of Classification Search
None
See application file for complete search history.

(56) References Cited

U.S. PATENT DOCUMENTS

| | | | | |
|---|---|---|---|---|
| 6,136,257 A * | 10/2000 | Graf | B22F 3/004 118/308 |
| 2015/0367448 A1* | 12/2015 | Buller | H05B 6/68 219/74 |

(Continued)

FOREIGN PATENT DOCUMENTS

| | | |
|---|---|---|
| JP | 2021 031 725 A * | 3/2021 |
| WO | 2020/237120 | 11/2020 |
| WO | 2020237120 A1 | 11/2020 |

OTHER PUBLICATIONS

Notification of Transmittal of the International Search Report and the Written Opinion of the International Searching Authority from corresponding PCT/EP2023/055560 dated Apr. 3, 2023.

*Primary Examiner* — Mohammad M Ameen
(74) *Attorney, Agent, or Firm* — PEARL COHEN LLP

(57) ABSTRACT

A powder dispenser (16) for metal-binder jetting is proposed. The powder dispenser (16) comprises a blade assembly (42) having: a first blade (44) and a second blade (46). The first blade (44) and the second blade (46) are separated, form a space (48) between them for holding a metal powder and a slit (18) for dispensing the metal powder, and the slit (18) has a width that is adjustable. A powder dispensing system (10) for metal-binder jetting is also proposed. The system (10) comprises a powder dispenser (16) having a slit (18), a dispenser support (20) configured to move the slit (18) between a refilling position and a dispensing position, and a rake (22) positioned between the refilling position and the dispensing position, wherein the rake (22) is arranged to scrape off metal powder at the slit (18).

11 Claims, 5 Drawing Sheets

(51) Int. Cl.
*B33Y 30/00* (2015.01)
*B22F 10/14* (2021.01)

(56) References Cited

U.S. PATENT DOCUMENTS

| | | | | |
|---|---|---|---|---|
| 2018/0079133 | A1* | 3/2018 | Ederer | B33Y 30/00 |
| 2020/0164586 | A1* | 5/2020 | Yuwaki | B29C 64/209 |

* cited by examiner

POWDER APPLICATOR FOR METAL-BINDER JETTING

CROSS-REFERENCE TO RELATED APPLICATIONS

This application is a U.S. National Phase Application under 35 U.S.C. § 371 of International Application No. PCT/EP2023/055560, filed Mar. 6, 2023, which claims priority to European Application No. 22160631.2, filed Mar. 7, 2022. Each application referenced above is hereby incorporated by reference in its entirety for all purposes.

TECHNICAL FIELD

The proposed technology relates to the field of additive manufacturing. The proposed technology relates specifically to the field of metal-binder jetting.

BACKGROUND

Metal-binder jetting is a sinter-based additive manufacturing process. A thin layer of a metal-containing powder is applied on a horizontally oriented printing plate. For example, this can be done by a powder dispenser positioned above and moving across the printing plate. The powder dispenser has an elongated slit that is transverse to the movement, and the powder is dispensed via the slit. An inkjet print head imprints an ink containing a binder in the metal layer. The powder layer is heated to dry the ink, for example by a heat lamp. The printing plate is lowered, and a new layer is applied on the existing layer. The process is repeated until the complete structure has been printed. This printed structure is commonly called a green part.

The post-printing process may vary. One example of such a process is given here. The printing plate is placed in an oven in which the green parts are heated and cured. The cured structures are commonly called brown parts. The remaining metal powder is removed from the printing plate. This can be done manually or by a machine. The brown parts are placed in a low-temperature furnace in which they are subjected to a combined debinding and sintering.

When dispensing the metal-containing powder on the printing plate, it is important that the resulting layers are even. The thickness of a layer should be the same across the printing plate. This is particularly important in high-precision applications. It is also important that the applied layer has a well-defined thickness. With better control of these parameter, an improved precision in the final structure can be achieved.

Object

It is an object of the proposed technology to improve the precision in metal-binder jetting. It is also an object of the proposed technology to improve the control of the dispensing of metal powder in metal-binder jetting. Specifically, it is an object to improve the uniformity of the layers and the control of the thickness of the layers of metal-containing powder.

SUMMARY

The proposed technology aims at meeting the abovementioned challenges. According to a first aspect of the proposed technology a powder dispenser for metal-binder jetting is provided. The powder dispenser comprises a blade assembly comprising: a first blade and a second blade. The first blade and the second blade are separated, or spaced apart, form a space between them for holding a metal powder and a slit for dispensing the metal powder, and the slit has a width that is adjustable, or variable.

The width of the slit determines the amount of metal powder that is dispensed. Thus, the adjustable width contributes to an improved control of the dispensing and of the thickness of the resulting layers.

Powder dispensers are also known as powder applicators or recoaters. Here, the term metal powder encompassing a metal-containing powder that is suitable for metal-binder jetting.

It is understood that a slit is elongated and straight. It is further understood that width of the slit is defined by the separation of the blades. The first blade and the second blade may converge to form the slit. It is further understood that the in use, the blades are oriented such that the slit faces downward and that the metal powder is dispensed in a downward direction. It is further understood that the slit dispenses the metal powder in the space between the blades. It is further understood that in use, the dispenser is oriented such that the metal powder in the space between the blades is dispensed via the slit by the force of gravity.

For example, the slit may have a width in the range 0.1 to 1 mm and a length in the range 50 to 400 mm. The length of the slit may be 50 to 4000 times greater than the width of the slit.

The first blade may have the same cross section along the complete slit. Similarly, the second blade may have the same cross section along the complete slit. This contributes to synchronous oscillations along the complete slit, which in turn results in a more uniform application of the powder layer.

The blade assembly may have a first end and an opposite second end. The slit extends from the first end to the second end, and the blade assembly has a first side opening between the first blade and the second blade at the first end. The space between the first blade and the second blade may be accessible via the first side opening, and the powder dispenser may further comprise: a first side cover attached, or fixed, to the first blade and covering the first side opening.

The first side cover may seal to, or form part of, the first blade. The first side cover may slidably seal to, or releasably contact, the second blade. This allows the two blades to oscillate independently from one another.

The side cover prevents the metal powder from leaving the first side opening without preventing the first and second blades from oscillating independently from one another. This allows for each blade to oscillate synchronously along the complete slit, which contributes to a more uniform application of the powder layer. The side cover also prevents metal powder from falling onto the printing plate via the side opening, which could result in an uneven powder layer.

The first side cover may comprise a first support and a first gasket that are attached to the first blade, wherein the first gasket is positioned between the first support and the first blade and is biased against the first blade and the second blade by the first support. For example, the first support may be a metal plate and the first gasket may be a silicone rubber sheet. The first support and the first gasket may be attached to the first blade by screws, which may be aligned with the slit.

Similarly, the blade assembly may have a second side opening between the first blade and the second blade at the second end, and the space between the first blade and the second blade may be accessible via the second side opening.

The powder dispenser may further comprise: a second side cover covering the second side opening. The second side cover may be attached, or fixed, to the first blade. This means that both the first side cover and the second side cover are attached to the first blade. The fact that both the first and second side covers are attached to the same first blade has the effects of an even weight distribution and a synchronous oscillation of the first blade along the slit, thus contributing to a more uniform application of the powder layer.

The second side cover may seal to, or form part of, the first blade. The second side cover may slidably seal to, or releasably contact, the second blade.

Similar to the first side cover, the second side cover may comprise a second support and a second gasket that are attached to the first blade, wherein the second gasket is positioned between the second support and the first blade and is biased against the first blade and the second blade by the second support. For example, the second support may be a metal plate and the second gasket may be a silicone rubber sheet. The second support and the second gasket may be attached to the first blade by screws aligned with the slit.

It is understood that the slit, the first side opening, and the second side opening may jointly form a single opening through which the space between the blades can be accessed.

The blade assembly may comprise: a first base portion, wherein the first blade is connected to and extends from the first base portion, and a second base portion, wherein the second blade is connected to and extends from the second base portion. The blade assembly may further comprise: a first side portion connecting the first base portion and the second base portion at the first end, and a second side portion connecting the first base portion and the second base portion at the second end.

The base portions and the side portions may jointly form a frame. The first base portion and the first blade may jointly form a solid or monolithic structure. Similarly, the second base portion and the second blade may jointly form a solid or monolithic structure. The base portions and the side portions may jointly form a solid or monolithic structure. For example, they may all be manufactured from a single piece of material, such as a single piece of steel. This contributes to a stable base for the blades when oscillating.

The abovementioned first side opening may extend from the slit to the first side portion. The first side cover may extend from the slit to the first side portion. Similarly, the abovementioned second side opening may extend from the slit to the second side portion. The second side cover may extend from the slit to the second side portion.

The powder dispenser may further comprise: a support that supports the first base portion, wherein the support is configured to allow a play between the first base portion and the support toward or away from the second base portion. Similarly, the support may support the second base portion, wherein the support is configured to allow a play between the second base portion and the support toward or away from the first base portion.

Worded differently, the support may slidably support the first base portion and the second base portion. The positions of the base portions may be adjustable relative to the support in a direction transverse to the slit.

The first blade and the second blade may be spaced apart from the support, which allows them to oscillate independently from the support. When in use, the play or the adjustment may be horizontal. The play between the support and the respective first and second base portion may be in the range 0 to 2 mm, or 0.5 to 1.5 mm.

The support may form a rigid frame. The support may further form a first rest on which the first base portion rests and a second rest on which the second base portion rests. The rigid frame, the first rest, and the second rest may jointly form a solid or monolithic structure. The base portions may conform to the rests. The first rest may define a planar first rest surface on which the first base portion rests, and the second rest may define planar a second rest surface upon which the second base portion rests, wherein the first and second rest surfaces are in the same plane. The slit may extend parallel to the rest surfaces. The support may further form an aperture between the first rest and the second rest through which the first and second base portions extend. In use, the rest surfaces are horizontal and the slit and the blades are located below the rest surfaces.

The powder dispenser may further comprise: one or more adjustable first pushers, wherein each first pusher engages the support and the first base portion and is arranged, or configured, to push the first base portion towards the second base portion. The first blade is connected to the first base portion. Thus, the first pushers are also arranged to push the first blade towards the second blade. In extension, this means that the width of the slit is decreased.

The powder dispenser may comprise a plurality of adjustable first pushers arranged in a series extending parallel to, or along, the slit. This allows for the slit width to be varied along the slit, or for a slit having a varying width along its length to be adjusted to have a uniform width.

The powder dispenser may further comprise: one or more adjustable second pushers, wherein each second pusher engages the support and the second base portion and is arranged, or configured, to push the second base portion towards the first base portion. The second blade forming the slit together with the first blade is connected to the second base portion. Thus, the width of the slit can be decreased also by the second pushers.

The powder dispenser may comprise a plurality of adjustable second pushers arranged in a series extending parallel to, or along, the slit. This also allows for the slit width to be varied along the slit, or for a non-uniform slit width to be corrected.

Each pusher may comprise a threaded through hole in the support, or in its rigid frame, and a cooperating threaded screw that extends through the through hole and engages the base portion. When tightening the screw, the screw pushes against the base portion. The threaded through hole may be parallel to the planar rest surfaces.

The powder dispenser may further comprise: one or more adjustable first pullers, wherein each first puller engages the support and the first base portion and is arranged, or configured, to pull the first base portion away from the second base portion. With the first blade being connected to the first base portion, the first puller allows for the width of the slit to be increased.

The powder dispenser may comprise a plurality of adjustable first pullers arranged in a series extending parallel to, or along, the slit. As for the first pushers, this allows for the slit width to be varied along the slit, or for slit having a varying width along its length to be adjusted to have a uniform width.

The powder dispenser may further comprise: one or more adjustable second pullers, wherein each second puller engages the support and the second base portion and is arranged, or configured, to pull the second base portion away from the first base portion. With the second blade being connected to the second base portion, the second puller allows for the width of the slit to be increased.

The powder dispenser may comprise a plurality of adjustable second pullers arranged in a series extending parallel to, or along, the slit. As for the plurality of first pullers, this allows for the slit width to be varied along the slit, or for a non-uniform slit width to be corrected.

Each puller may comprise a through hole in the support, or in its rigid frame, a threaded hole in the base portion that is aligned with the through hole, and a threaded screw that extends through the through hole in the support, cooperates with the threaded hole in the base portion, and has a head that engages the support. When tightening the screw, the head of the screw pushes against the support and the screw pulls on the base portion. The through hole in the support and the threaded hole in the base portion may be parallel to the planar rest surfaces.

It is understood that the pushers and pullers can change the relative position of the first base portion and the second base portion, and that this can be achieved by deforming the blade assembly, for example by compressing or extending the abovementioned first and second side portions.

The number of first pushers and the number of first pullers may be the same. The first pushers and the first pullers may be arranged pairwise with the first puller being located at the first pusher in each pair. Similarly, the number of second pushers and the number of second pullers may be the same. The second pushers and the second pullers may be arranged pairwise with the second puller being located at the second pusher in each pair.

By using both pushers and pullers simultaneously, a base portion can be locked in the direction of the other base portion.

The powder dispenser may further comprise: one or more first locks arranged, or configured, to lock the first base portion to the support. The one or more first locks may press, or bias, the first base portion against the first rest, or the first rest surface. The powder dispenser may comprise a plurality of first locks arranged in a series extending parallel to, or along, the slit.

Similarly, the powder dispenser may further comprise: one or more second locks arranged, or configured, to lock the second base portion to the support. The one or more second locks may press, or bias, the second base portion against the second rest, or the second rest surface. The powder dispenser may comprise a plurality of second locks arranged in a series extending parallel to, or along, the slit.

Each lock or may comprise a through hole in the base portion, a threaded hole in the rest, or in the support, and a threaded screw that extends through the through hole in the base portion, cooperates with the threaded hole in the rest, and has a head that engages the base portion. The threaded hole may be in the rest surface of the rest. The trough hole in the base portion may be configured to allow the abovementioned play between the base portion and the support, for example by being oversized relative to the screw. The through hole in the base portion and the threaded hole in the rest may be perpendicular to the planar rest surface.

When tightening the screw, the head of the screw pushes against the base portion and presses, or biases, the base portion against the rest, or the rest surface, thus locking the base portion to the support. This prevents a change in the width of the slit during operation.

The powder dispenser may further comprise: one or more first oscillators, or vibrators, attached, or fixed, to the first blade and configured to generate oscillations, or vibrations, of the first blade.

The oscillations, or vibrations, may be towards and away from the second blade. This causes the metal powder in the space between the first and second blades to fluidize, allowing it to be via the slit. The powder dispenser may comprise a plurality of first oscillators arranged in a series extending parallel to, or along, the slit. This means that they all have the same distance to the slit.

Similarly, the powder dispenser may further comprise: one or more second oscillators, or vibrators, attached, or fixed, to the second blade and configured to generate oscillations, or vibrations, of the second blade. The oscillations, or vibrations, may be towards and away from the first blade. The powder dispenser may comprise a plurality of second oscillators arranged in a series extending parallel to, or along, the slit.

Each oscillator or may be attached to the blade or at an attachment point that is spaced apart from the slit and the base portions. For example, the attachment point may be closer to center between the slit and the base portion than to the slit and base portion as such.

In operation, the oscillations generated by the oscillators are configured to cause the metal powder in the space between the blades to flow and be dispensed via the slit. For example, each oscillator may comprise a piezo-electric element generating the oscillations.

It is further understood that the blades and the oscillators may be configured to oscillate the blades transversely to the slit.

As mentioned above, the first blade may be connected to and extends from the first base portion. It may further be configured to oscillate relative to the first base portion. Similarly, the second blade may be connected to and extend from the second base portion. It may further be configured to oscillate relative to the second base portion.

The powder dispenser may further comprise: a funnel for holding the metal powder, wherein the funnel is attached, or fixed, to the support, the space between the first blade and the second blade is coupled to, or in fluid communication with, the funnel, and the funnel is configured to supply the metal powder to the space between the blades.

According to a second aspect of the proposed technology, a powder dispensing system for metal-binder jetting is provided. The system comprises: a slate, or table, defining a planar upper surface, or upward facing surface, wherein the upper surface is oriented horizontally, and a powder dispenser having a slit for dispensing a metal powder in a downward direction. The system further comprises: a dispenser support supporting the powder dispenser above the slate, wherein the dispenser support is configured to move the slit of the powder dispenser parallel to the upper surface between a refilling position and a dispensing position. The system further comprises: a rake extending from the upper surface and positioned between the refilling position and the dispensing position, wherein the rake is arranged to scrape off, or remove, metal powder at the slit at a change in position from the refilling position to the dispensing position.

If there is metal powder at the slit when dispensing a layer of metal powder, it may cause the layer to be uneven. Thus, the rake contributes to an improved uniformity of the dispensed layers.

The powder dispenser may have any of the features of the powder dispenser described above. It is understood that the rake scrapes off metal powder on the powder dispenser. The slit may be parallel with the upper surface of the slate. It is understood that the powder dispenser is supplied with the metal powder at the refilling position and that it dispenses metal powder at the dispensing position.

The dispenser support may be configured to move the powder dispenser with the slit parallel to the upper surface between the refilling position and the dispensing position in a linear motion. For example, the system may have a printing plate lift at the dispensing position that is configured to lower the printing plate after each dispensing of a layer. This way, the powder dispenser can maintain the same elevation relative to the slate between and at both positions.

The powder dispenser may have a downward pointing tip, or downward facing end, forming the slit, wherein the rake is arranged, or configured, to scrape off metal powder on the tip of the powder dispenser at the change in position from the refilling position to the dispensing position. The downward pointing tip may be formed by the first blade and the second blade. The rake may engage, or contact, the tip of the powder dispenser at the change in position from the refilling position to the dispensing position.

The tip may define a downward facing surface that is convex transversely to the slit, and the rake engages the downward facing surface at the change in position of the slit from the refilling position to the dispensing position. This contributed to softer contact between rake and the tip. The slit may break, or interrupt, the downward facing surface at its nadir, or its lowest point.

The rake may be of an elastic material. For example, the elastic material may be an elastomer, such as silicone rubber. The rake may be straight. The rake may be elongated. The length of the rake may be longer than the length of the slit. The rake may be oriented parallel to the tip, or the slit.

The powder dispensing system may comprise: a rake holder defining planar top surface that is parallel with the upper surface of the slate. The two surfaces may be coplanar. The rake holder may form an elongated recess that holds the rake. The recess may be parallel to the tip, or the slit.

The powder dispensing system may further comprise: an evacuation system having one or more suction inlets for removing metal powder, wherein the suction inlets are located between the refilling position of the slit and the rake. More specifically, the suction inlets may be configured for removing metal powder that has been removed from the powder dispenser by the rake. This way, metal powder that is scraped off from the powder dispenser does not build up at the rake, which allows for repeated refilling and dispensing of the metal powder. The suction inlets may be configured to remove the metal powder in a downward direction. They may be located at a lower elevation than the slit. The suction inlets may be located at the rake. They may be coplanar with the upper surface of the slate, or the top surface of the rake holder. The powder dispenser may comprise a plurality of suctions inlets arranged in a series extending parallel to the rake.

The rake holder may form the suction inlets. It may further form a manifold collecting metal powder from the suction inlets in a single conduit. The conduit in turn may be coupled to a suction unit, or vacuum unit, that collects the metal powder.

BRIEF DESCRIPTION OF THE DRAWINGS

A more complete understanding of the abovementioned and other features and advantages of the proposed technology will be apparent from the following detailed description in conjunction with the appended drawings, wherein.

DESCRIPTION OF THE DRAWINGS

Figure 1:
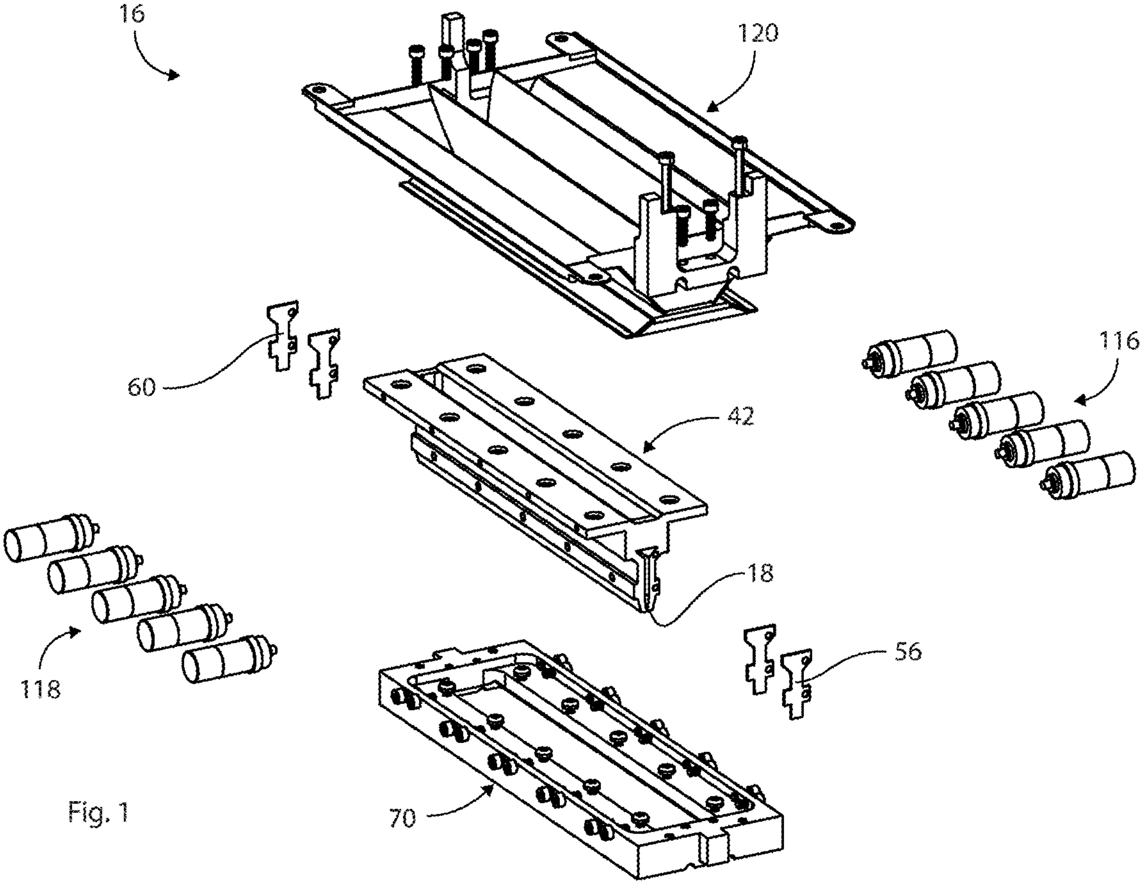
FIG. 1 is an exploded perspective view of an embodiment of powder dispenser.
Figure 2:
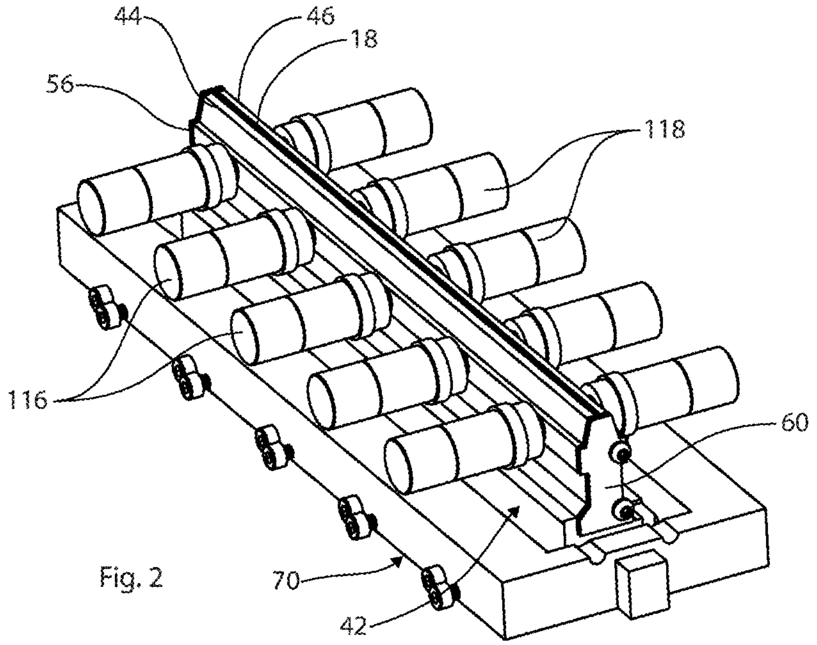
FIG. 2 is a perspective bottom view of the powder dispenser with the funnel removed.

FIGS. 1 to 6 show an embodiment of powder dispenser 16. An exploded perspective view is shown in FIG. 1. The powder dispenser 16 has a blade assembly 42, a support 70, oscillators 116 and 118, side covers 56 and 60, and a funnel 120. FIG. 2 is a perspective bottom view of the assembled powder dispenser 16 without the funnel 120 mounted on the support 70.

Figure 4A:
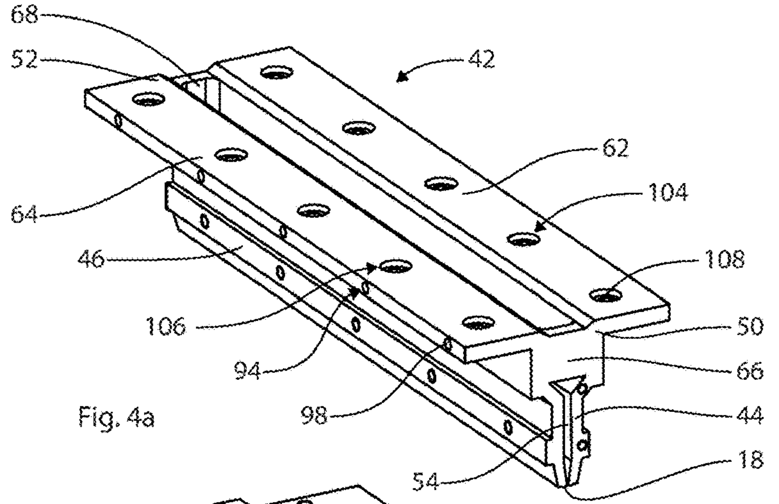
FIG. 4*a* is a perspective view of the blade assembly of the powder assembly.

The blade assembly 42 is monolithic and manufactured from a single piece of steel. Details of the blade assembly 16 are shown in FIG. 4*a*. It has a first blade 44, a second blade 46, a first base portion 62, and a and a second base portion 64. The first blade 44 is connected to and extends from the first base portion 62 and the second blade 46 is connected to and extends from the second base portion 64.

The blade assembly 42 has a first end 50 and an opposite second end 52. A first side portion 66 connects the first base portion 62 and the second base portion 64 at the first end 50, and a second side portion 68 connects the first base portion 62 and the second base portion 64 at the second end 52. The complete blade assembly 42 is a monolithic structure.

Figure 3:
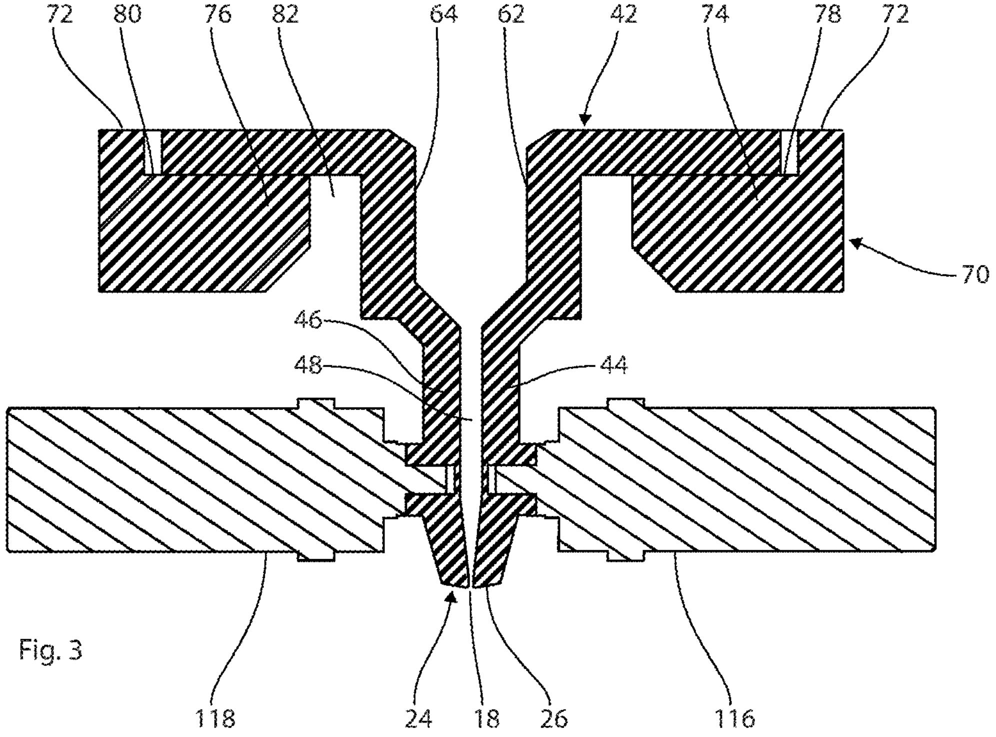
FIG. 3 is a cross section showing the blade assembly. support, and oscillators of the powder dispenser.

The first and second blades 44 and 46 are spaced apart and form a space 48 between. In use, this space 48 is filled with a metal powder. The first and second blades 44 and 46 converge to form an elongated and straight slit 18 through which the metal powder in the space 48 can be dispensed. The separation of the first and second blades 44 and 46 at the slit 18 determined the width of the slit 18. Each of the first and second blades 44 and 46 has the same cross section along the complete slit 18. The cross sections are shown in FIG. 3.

The first blade 44 and the second blade 46 jointly form a downward pointing tip 24 having a downward facing surface 26 that is convex transversely to the slit 18. The downward facing surface 26 is at its lowest point separated by the slit 18 into two surface portions.

The funnel 120 is attached to the support 70 and the space 48 between the first blade 44 and the second blade 46 is in fluid communication with the funnel 120. This way, a metal powder deposited in the funnel 120 is supplied to the space 48 between the blades 44 and 46.

The slit 18 extends from the first end 50 to the second end 52 of the blade assembly 42. The blade assembly 42 has a first side opening 54 between the first blade 44 and the second blade 46 at the first end 50 and a second side opening (not shown) between the first blade 44 and the second blade 46 at the second end 52. The first side opening 54 and the second side opening (not shown) extend from the slit 18 to the first side portion 66 and the second side portion 68, respectively. The space 48 between the first and second blade 44 and 46 is accessible via the first and second side openings 54 and (not shown). The slit 18, the first side opening 54, and the second side opening (not shown) jointly form a single opening through which the space 48 between the first and second blades 44 and 46 can be accessed.

The orientation of the first and second blades 44 and 46 during use is shown in FIG. 3. The dispenser 16 is oriented such that the metal powder in the space 48 between the blades 44 and 46 is dispensed in a downward direction via the slit 18 by the force of gravity.

Figure 4B:
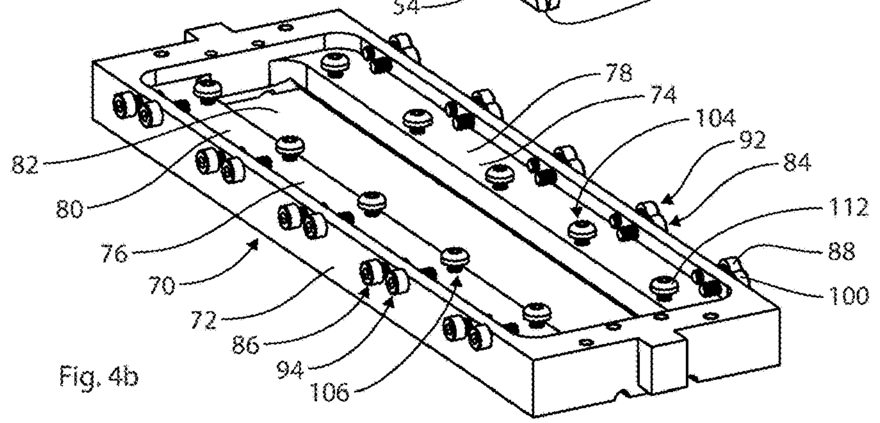
FIG. 4*b* is a perspective view of the support of a powder assembly.

The support 70 is monolithic and manufactured from a single piece of steel. Details of the support 70 are shown in FIG. 4*b*. The support 70 has a rigid frame 72, a first rest 74, and a second rest 76 that jointly form the monolithic structure. The first rest 74 defines a planar first rest surface 78 on which the first base portion 62 rests, and the second rest 76 defines planar a second rest surface 80 upon which the second base portion 64 rests. The first and second rest surfaces 78 and 80 are in the same plane. The slit 18 extends parallel to the rest surfaces 78 and 80. The support 70 forms an aperture 82 between the first rest 74 and the second rest 76 through which the first and second base portions 62 and 64 of the blade assembly 42 extend downward.

The first and second rest surfaces 78 and 80 slidably supports the first base portion 62 and the second base portion 64. The first blade 44 and the second blade 46 are spaced apart from the support 70, as is shown in FIG. 3, which allows them to oscillate without contacting the support 70. The support 70 allows for a play between the first base portion 62 and the frame 72 of the support 70 toward or away from the second base portion 64. Similarly, the support 70 is allows a play between the frame 72 of the second base portion 64 and the support 70 toward or away from the first base portion 62. The play between the support 70 and the base portions 62 and 64 can be seen in FIG. 3. This means that the support 70 slidably supports the first base portion 62 and the second base portion 64, and the positions of the base portions 62 and 64 can be adjustable relative to the support 70 in a direction transverse to the slit 18. The maximum play is about 1.2 mm.

Figure 5A:
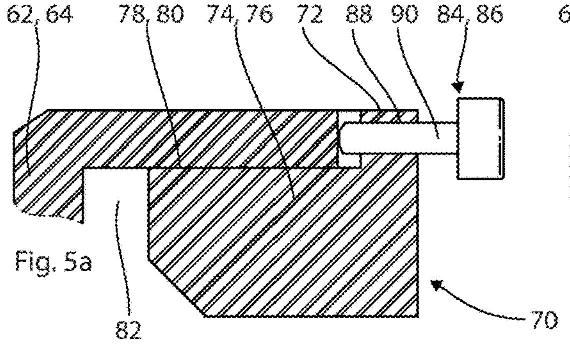
FIG. 5*a* is a cross section showing the function of the pusher.

The powder dispenser 16 has five adjustable first pushers 84 that engage the support 70 and the first base portion 62 and five adjustable second pushers 86 that engage the support 70 and the second base portion 64. The first pushers 84 and the second pushers 86 are respectively arranged in a line parallel to the slit 18. The pushers 84 and 86 are shown in FIGS. 4*b* and 5*a*.

Each pusher 84 or 86 has a threaded through hole 88 in the rigid frame 72 of the support 70 that is parallel to the planar rest surfaces 78 or 80. It further has a cooperating threaded screw 90 that extends through the through hole 88 and engages the base portion 62 or 64. When the screw 90 is tightened, it pushes against the base portion 62 or 64. This way, the first pusher 84 is arranged to push the first base portion 62 towards the second base portion 64, and the second pusher 86 is arranged to push the second base portion 64 towards the first base portion 62.

Figure 5B:
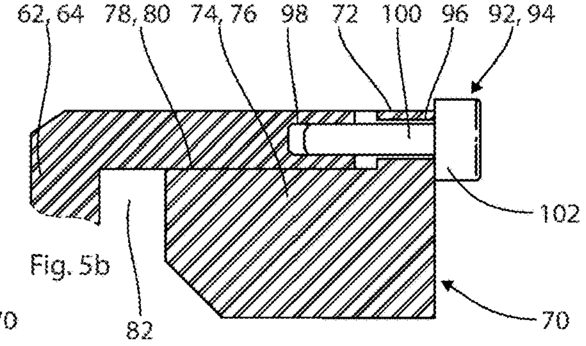
FIG. 5*b* is a cross section showing the function of the puller.

The powder dispenser 16 also has five adjustable first pullers 92 that engages the support 70 and the first base portion 62 and five adjustable second pullers 94 that engages the support 70 and the second base portion 64. The first pullers 92 and the second pullers 94 are respectively arranged in a line extending parallel to the slit 18. The pullers 92 and 94 are shown in FIGS. 4*b* and 5*b*. Each puller 92 or 94 has a through hole 96 in the rigid frame 72 of the support 70 and a threaded hole 98 in the base portion 62 or 64 that is aligned with the through hole 96. A threaded screw 100 extends through the through hole 96 in the support 70 that cooperates with the threaded hole 98 in the base portion 62 or 64. The threaded screw 100 has a head 102 that engages the support 70, and when tightening the screw 100, the head 102 of the screw pushes against the support 70 and the screw 100 pulls on the base portion 62 or 64. This way, the first puller 92 is arranged to pull the first base portion 62 away from the second base portion 64, and the second puller 92 is arranged to pull the second base portion 64 away from the first base portion 62.

The first pushers 84 and the first pullers 92 are arranged pairwise, and the second pushers 86 and the second pullers 94 are arranged pairwise, as shown in FIG. 4*b*. The pushers 84 and 86 and pullers 92 or 94 can change the relative position of the base portions 62 and 64 by compressing or lengthening the first and second side portions 66 and 68 of the knife assembly 42.

The first blade 44 is connected to the first base portion 62 and the second blade 46 is connected to the second base portion 64. Additionally, the separation of the first and second blades 44 and 46 at the slit 18 determines the width of the slit 18. Thus, the pushers 84 and 86 and pullers 92 or 94 can be used to change the width of the slit 18. This way, the slit 18 has a width that is adjustable. The arrangement of the pushers 84 and 86 and pullers 92 or 94 in lines that are parallel to the slit 18 allows for slit 18 with non-uniform width to be adjusted. This way, the width of the slit 18 can be varied between 0.1 to 1 mm. The slit has a length of about 300 mm.

Figure 5C:
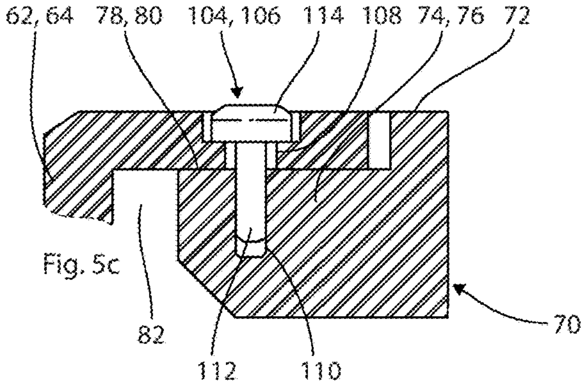
FIG. 5*c* is a cross section showing the function of the lock.

The powder dispenser 16 has five first locks 104 that press the first base portion 62 against the first rest 74 and lock the first base portion 62 to the support 70. It also has five second locks 106 that press the second base portion 64 against the second rest 76 and lock the second base portion 64 to the support 70. The function of the first and second locks 104 and 106 is shown in FIG. 5*c*. The first locks 104 and the second locks 106 are respectively arranged in a series running parallel to the slit 18.

Each lock 104 or 106 has a through hole 108 in the base portion 62 or 64 and a threaded hole 110 in the rest surface 78 or 80 of the rest 74 or 76. A threaded screw 112 extends through the through hole 108 in the base portion 62 or 64 and cooperates with the threaded hole 110 in the rest 74 or 76. The threaded screw 112 has a head 114 that engages the base portion 62 or 64. The trough hole 108 in the base portion 62 or 64 has a greater diameter than the threaded screw 112, which allows for the abovementioned play between the base portion 62 or 64 and the support 70 toward or away from the other base portion 62 or 64 when the screw 112 is untightened. When tightening the screw 112, the head 114 of the screw pushes against the base portion 62 or 64 and presses the base portion 62 or 64 against the rest surface 78 or 80 of the rest.

The powder dispenser 16 has five first oscillators 116 attached to the first blade 44 that can generate oscillations of the first blade 44 towards and away from the second blade 46. It also has five second oscillators 118 attached to the second blade 46 that can generate oscillations of the second blade 46 towards and away from the first blade 44. The first oscillators 116 and the second oscillators 118 are respectively arranged in a line extending parallel to the slit 18, as shown in FIG. 2. Each oscillator 116 and 118 has a piezoelectric element (not shown) that causes them to oscillate. In operation, the oscillations cause the metal powder in the space 48 between the first and second blades 44 and 46 to fluidize and be dispensed via the slit 18.

Figure 6A:
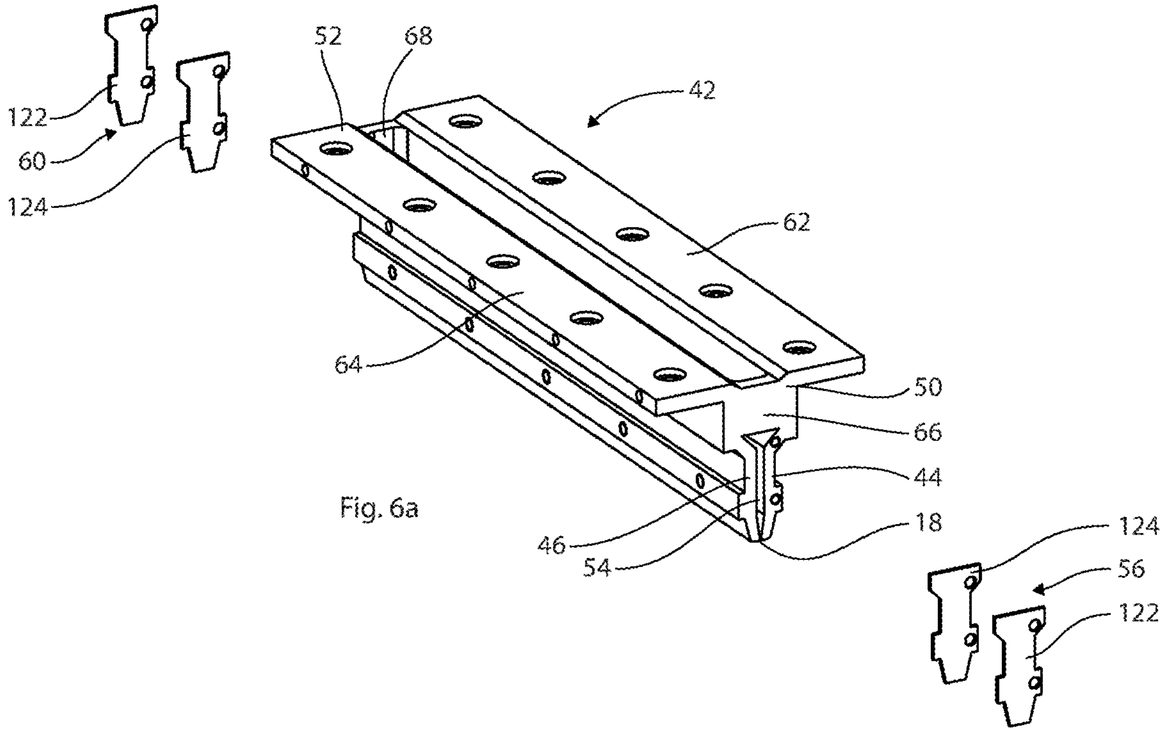
FIG. 6*a* is a perspective view of the blade assembly with the side covers removed.
Figure 6B:
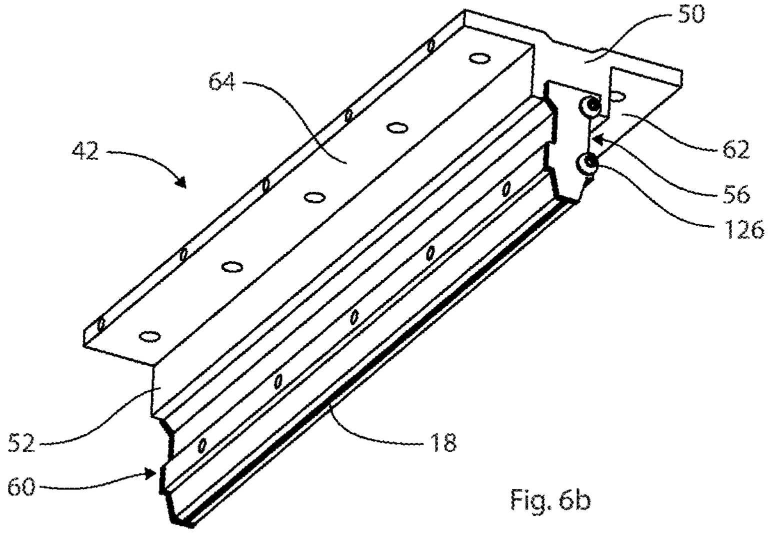
FIG. 6*b* is a perspective view of the blade assembly with the side covers mounted.

The powder dispenser 16 has a first side cover 56 attached to the first blade 44 that covers the first side opening 54 and seals to the first blade 44 and slidably seals to the second blade 46. It also has a second side cover 60 attached to the same first blade 44 that covers the second side opening (not shown) and seals to the first blade 44 and slidably seals to the second blade 46. The separate side covers 56 and 60 are shown in FIG. 6*a* and the mounted side covers 56 and 60 are shown in FIG. 6*b*.

Each side cover 56 and 60 is composed of a metal plate forming a support 122 and a silicone rubber sheet forming a gasket 124. The gasket 124 is positioned between the support 122 and the first blade 44 and is biased against the first blade 44 and the second blade 46 by the support 122. The support 122 and the gasket 124 are attached to the first blade 44 by screws 126 that are aligned with the slit 18. This way, the side covers 56 and 60 prevent metal powder in the space 48 formed between the first and second blades 44 and 46 from leaving though the side openings 54 and (not shown) when the blades 44 and 46 oscillate. The side covers 56 and 60 have the same shape, thus contributing to an even load on the blades 44 and 46.

Figure 7:
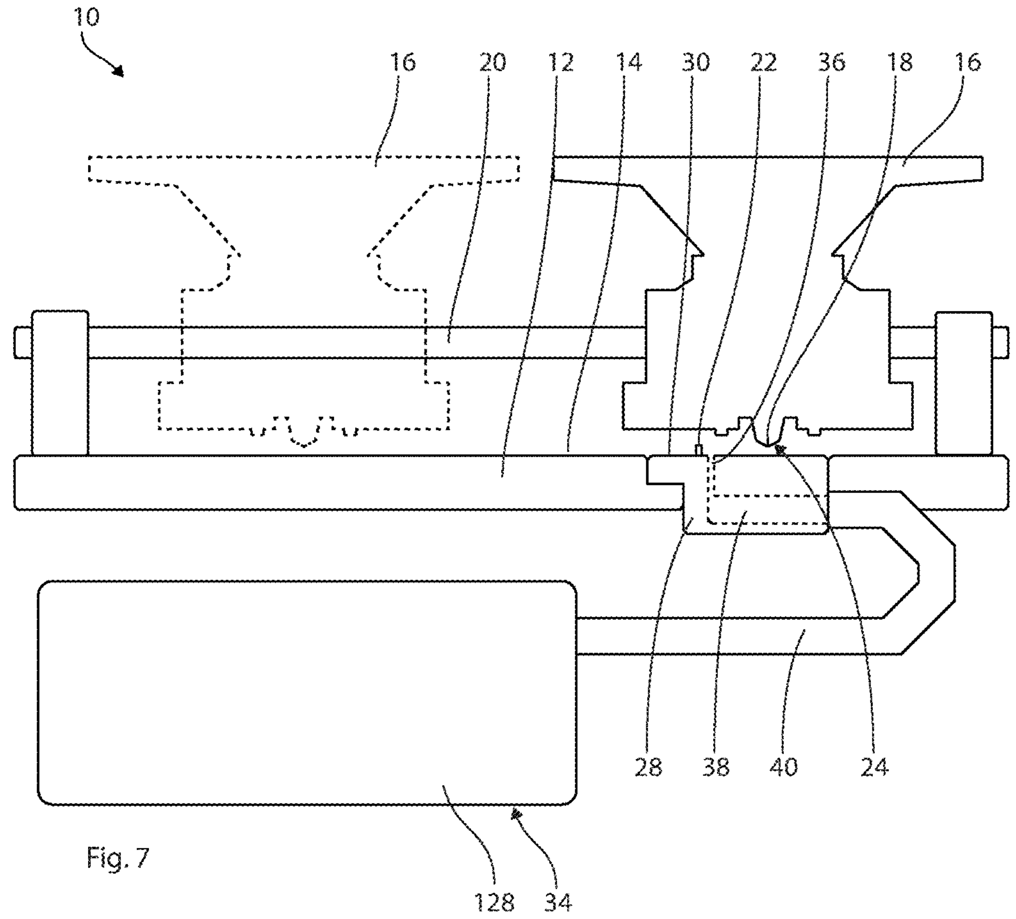
FIG. 7 is a schematic view of a powder dispensing system.

FIG. 7 is a schematic view of a powder dispensing system 10 for metal-binder jetting having a powder dispenser 16 as described in relation to FIGS. 1 to 6. The system 10 has a stone slate 12 defining a planar, upward facing, and horizontal upper surface 14. The slit 18 of the powder dispenser 16 is oriented to so that the metal powder is dispensed downward with the slit 18 parallel with the upper surface 14 of the slate 12. The system 10 has a dispenser support 20 that supports the powder dispenser 16 above the slate 12 and that can move the powder dispenser 16, and in extension the slit 18, parallel to the upper surface 14 between a refilling position and a dispensing position.

At the refilling position, metal powder is deposited in the funnel 120 of the powder dispenser 16, and at the dispensing position the powder dispenser dispenses the metal powder on a printing plate (not shown) resting on a printing plate lift (not shown). In FIG. 7, the refilling positioned is indicated with the powder dispenser 16 in solid lines and the dispensing position is indicated with the powder dispenser 16 in dashed lines.

The system has a straight and elongated rake 22 of silicone rubber that is parallel to and longer than the slit 18. It extends from the upper surface 14 and is positioned between the refilling position and the dispensing position. When the powder dispenser 16 passes over the rake 22, the rake 22 engages the convex downward facing surface 26 of the tip 24 formed by the first and second blades 44 and 46 and scrapes off metal powder at the slit 18.

Figure 8:
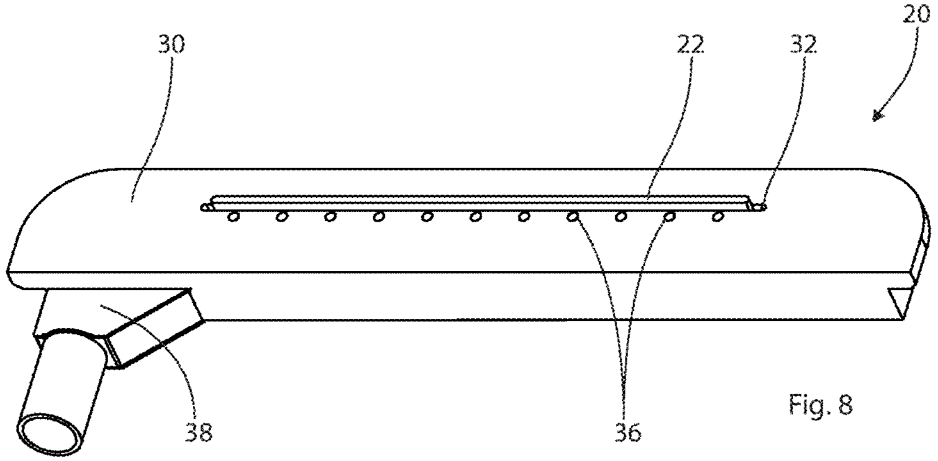
FIG. 8 is a perspective view of a rake holder of the powder dispensing system.

The powder dispensing system 10 has a rake holder 28 that is illustrated in FIG. 8. The rake holder 28 is supported by the slate 12 and defines planar top surface 30 that is parallel and coplanar with the upper surface 14 of the slate 12. The rake holder 28 forms an elongated recess 32 that is parallel to the slit 18 and holds the rake 22.

The powder dispensing system 10 has an evacuation system 34 with suction inlets 36 formed by the rake holder 28. The suction inlets 36 are located at the rake 22 and between the refilling position of the slit 18 and the rake 22. The suction inlets 36 are arranged in a series parallel to the rake 22 and metal powder that has been scraped off by the rake 22 can be removed through the suction inlets 36. The rake holder 28 forms a manifold 38 collecting metal powder from the suction inlets 36 in a single conduit 40. The conduit 40 is coupled to a suction unit 128 that collects the metal powder.

ITEM LIST

10 powder dispensing system
12 slate
14 planar upper surface of slate
16 powder dispenser
18 slit
20 dispenser support
22 rake
24 tip or end
26 downward facing surface
28 rake holder
30 top surface of rake holder
32 recess
34 evacuation system
36 suction inlets
38 manifold
40 conduit
42 blade assembly
44 first blade
46 second blade
48 space between first blade and second blade
50 first end of blade assembly
52 second end of blade assembly
54 first side opening of blade assembly
56 first side cover or first plate
60 second side cover or first plate
62 first base portion
64 second base portion
66 first side portion
68 second side portion
70 support
72 frame
74 first rest
76 second rest
78 first rest surface
80 second rest surface
82 aperture
84 first pushers
86 second pushers
88 threaded through hole of pusher
90 threaded screw of pusher
92 first pullers
94 second pullers
96 through hole of puller
98 threaded hole of puller
100 threaded screw of puller
102 head of threaded screw of puller
104 first locks
106 second locks
108 through hole of lock
110 threaded hole of lock
112 threaded screw of lock
114 head of threaded screw of lock
116 first oscillators
118 second oscillators
120 funnel
122 support of side cover
124 gasket of side cover
126 screw of side cover
128 suction unit of evacuation system

The invention claimed is:

1. A powder dispenser for metal-binder jetting, the powder dispenser comprising a blade assembly, the blade assembly comprising:

a first blade and a second blade, wherein the first blade and the second blade are separated, forming a space between them for holding a metal powder and a slit for dispensing the metal powder, and the slit has a width that is adjustable, wherein the blade assembly comprises:

a first base portion, wherein the first blade is connected to and extends from the first base portion, a second base portion, wherein the second blade is connected to and extends from the second base portion, a first side portion connecting the first base portion and the second base portion at the first end, and a second side portion connecting the first base portion and the second base portion at the second end.

2. The powder dispenser according to claim 1, wherein the blade assembly has a first end and an opposite second end, wherein the slit extends from the first end to the second end, the blade assembly has a first side opening between the first blade and the second blade at the first end, the space between the first blade and the second blade is accessible via the first side opening, and the powder dispenser further comprises:

a first side cover attached to the first blade and covering the first side opening.

3. The powder dispenser according to claim 1, wherein the powder dispenser further comprises:

a support that supports the first base portion, wherein the support is configured to allow a play between the first base portion and the support toward or away from the second base portion.

4. The powder dispenser according to claim 3, wherein the powder dispenser further comprises:

one or more adjustable first pushers, wherein each first pusher engages the support and the first base portion and is arranged to push the first base portion towards the second base portion.

5. The powder dispenser according to claim 3, wherein the powder dispenser further comprises:

one or more adjustable first pullers, wherein each first puller engages the support and the first base portion and is arranged to pull the first base portion away from the second base portion.

6. The powder dispenser according to claim 3, wherein the powder dispenser further comprises:

one or more first locks arranged to lock the first base portion to the support.

7. The powder dispenser according to claim 1, wherein the powder dispenser further comprises: one or more first oscillators attached to the first blade and configured to generate oscillations of the first blade.

8. A powder dispensing system for metal-binder jetting comprising:

a slate, or table, defining a planar upper surface, wherein the upper surface is oriented horizontally, a powder dispenser according to claim 1 arranged for dispensing a metal powder in a downward direction, a dispenser support supporting the powder dispenser above the slate, wherein the dispenser support is configured to move the slit of the powder dispenser parallel to the upper surface between a refilling position and a dispensing position, a rake extending from the upper surface and positioned between the refilling position and the dispensing position, wherein the rake is arranged to scrape off metal powder at the slit at a change in position from the refilling position to the dispensing position.

9. The powder dispensing system according to claim 8, wherein the powder dispenser has a downward pointing tip forming the slit, wherein the rake is arranged to scrape off metal powder on the tip of the powder dispenser at the change in position from the refilling position to the dispensing position.

10. The powder dispensing system according to claim 9, wherein the tip defines a downward facing surface that is convex transversely to the slit, and the rake engages the downward facing surface at the change in position of the slit from the refilling position to the dispensing position.

11. The powder dispensing system according to claim 8 further comprising: an evacuation system having one or more suction inlets for removing metal powder, wherein the suction inlets are located between the refilling position of the slit and the rake.

* * * * *